United States Patent [19]

Serbent et al.

[11] 4,238,222

[45] Dec. 9, 1980

[54] WAELZ PROCESS OF VOLATILIZING ZINC AND LEAD FROM IRON OXIDE-CONTAINING MATERIALS

[75] Inventors: Harry Serbent, Hanau; Gerhard Reuter, Frankfurt am Main; Wolfram Schnabel, Hattersheim; Günter Kossek, Duisburg, all of Fed. Rep. of Germany

[73] Assignee: Metallgesellschaft Aktiengesellschaft, Frankfurt am Main, Fed. Rep. of Germany

[21] Appl. No.: 59,413

[22] Filed: Jul. 20, 1979

[30] Foreign Application Priority Data

Jul. 20, 1978 [DE] Fed. Rep. of Germany ....... 2831911

[51] Int. Cl.³ .................... C22B 1/02; C22B 13/02; C22B 19/16
[52] U.S. Cl. ........................................ 75/7; 75/25; 75/77; 75/86; 75/87
[58] Field of Search .................. 75/25, 7, 77, 86, 87

[56] References Cited

U.S. PATENT DOCUMENTS

| | | | |
|---|---|---|---|
| 1,754,170 | 4/1930 | Johannsen | 75/87 |
| 2,073,994 | 3/1937 | Queneau | 75/87 |
| 2,144,914 | 1/1939 | Debuch | 75/87 X |
| 3,754,890 | 8/1973 | Fitch | 75/25 X |
| 3,770,416 | 11/1973 | Goksel | 75/25 |
| 3,890,141 | 6/1975 | Crane et al. | 75/25 X |

*Primary Examiner*—G. Ozaki
*Attorney, Agent, or Firm*—Sprung, Felfe, Horn, Lynch & Kramer

[57] ABSTRACT

In a Waelz process of volatilizing zinc and lead from iron-containing and oxide-containing material in an inclined rotary kiln, which is charged at its upper end with the material together with solid carbonaceous reducing agent having a high content of volatile combustible constituents, wherein the reduction and volatilization are effected below the softening point of the charge, metallic iron-containing material is discharged from the lower end of the rotary kiln, combustion air is sucked into the lower end of the rotary kiln, and the exhaust gases are sucked from the upper end, the improvement which comprises blowing oxygen-containing gases through tubular air nozzles into the charge disposed over said tubular air nozzles in that region of the heating-up zone which begins where ignitable particles of the solid reducing agent begin to occur and which terminates at up to 50 percent of the length of the kiln.

5 Claims, No Drawings

WAELZ PROCESS OF VOLATILIZING ZINC AND LEAD FROM IRON OXIDE-CONTAINING MATERIALS

BACKGROUND OF THE INVENTION

Field of the Invention

This invention relates to a Waelz process of volatilizing zinc and lead from iron-containing and oxide-containing materials in an inclined rotary kiln, which is charged at its upper end with the material together with solid carbonaceous reducing agent having a high content of volatile combustible constituents, wherein the reduction and volatilization are effected below the softening point of the charge, metallic iron-containing material is discharged from the lower end of the rotary kiln, combustion air is sucked into the lower end of the rotary kiln, and the exhaust gases are sucked from the upper end. More especially, this invention relates to such a process wherein oxygen-containing gas is introduced directly into the charge through air nozzles over which the charge is disposed at a point defined by the point where ignitable particles of the reducing agent first appear and 50 percent of the length of the kiln.

The Waelz process is used for a treatment of raw materials which contain volatilizable metals or volatilizable metal compounds, mainly for a reduction and volatilization of zinc and lead from relatively low-metal precursors, such as corresponding ores, intermediate products, slags from lead blast furnaces, retort residues, etc. The reaction unit consists of an inclined rotary kiln, which is operated continuously. The reducing agent typically consists of solid carbon, which is fed with the charge, and optional carbon contained in the raw materials. The required combustion air is sucked into the rotary kiln from its discharge end. The exhaust gases leave the furnace through the charging end. Two interdependent reactions are performed in the charge: the reduction of, e.g., zinc oxide by means of carbon monoxide

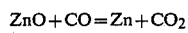

$$ZnO + CO = Zn + CO_2$$

and the Boudouard reaction of the resulting carbon dioxide

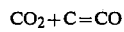

$$CO_2 + C = CO$$

to form new CO for the reduction. Part of the resulting CO and the zinc, which becomes available at a temperature above its boiling point, enter the free kiln space above the charge and are burnt there. The resulting zinc oxide dust is collected from the exhaust gas.

Iron oxides contained in the raw materials are reduced too. Most of the iron is contained as metallic iron in the material discharged from the kiln. Whereas in the Renn Waelz process, the charge has a pasty consistency in the final zone of the rotary kiln and the metallic iron agglomerates to form balls or spheres, the metallic iron is finely divided in the material discharged from the kiln in the Waelz process and if said material has a sufficiently high iron content, it can be used to produce crude iron and steel.

The Waelz process has been used more recently on an increasing scale in the recovery and re-use of the residual substances which inevitably become available in the production of crude iron and steel and may consist of dusts and muds obtained from blast furnace plants, sintering plants, steel making and rolling mill plants. That practice eliminates the need for dumping the substances and permits re-use of their metal contents in a high degree. The solid material discharged from the rotary kiln contains metallic iron and is generally charged to a blast furnace.

It has been believed for a long time that only coke breeze and anthracite can be used as reducing agents in the Waelz process. West German Offenlegungsschrift 26 21 969 describes a process in which a mixture of a carbonaceous material which reacts quickly and a carbonaceous material which reacts slowly is fed as solid reducing agent into the upper end of the rotary kiln. The proportion of the carbonaceous material which reacts slowly is about 20 to 80 percent, particularly 40 to 60 percent, based on fixed carbon. Reducing agents which react quickly are, e.g., brown coals or lignites. Carbonaceous reducing agents which react slowly are, e.g., anthracites, long-flaming gas coals, and coke. The maximum temperature in the kiln can be adjusted between 900° and 1050° C., and preferably between 950° and 1000° C. The combined use of reducing agents which react quickly and slowly, respectively, permits of a higher throughput rate and decreases the incrustation, results in a relatively low carbon surplus of carbon in the material discharged from the rotary kiln, and prevents a sintering of the charge and a reoxidation of the metallic iron which has been formed. When more heat from the kiln gases is offered in the reduction zone, the temperature of the charge will not increase in that zone until substantially all oxygen has been removed from the oxides. In that zone, virtually all heat which is offered by the kiln gases and the kiln wall is consumed in the highly endothermic Boudouard reaction within the charge so that no heat is available for a temperature rise of the charge. In that region the temperature curve of the charge is virtually horizontal in the longitudinal direction of the kiln and rises only toward the discharge end, when almost all oxygen has been removed from the oxides. Because the reducing agents have different reactivities, the temperature level is decreased as the reducing agents which react quickly tend to decrease the temperature whereas the remaining reducing agents which react slowly prevent a carbon deficiency in the final zone.

In a modified Waelz process, the rotary kiln is provided with a continuously operated central burner and with shell tubes for continuously supplying air into the kiln axis and anthracite is used as a reducing agent ("Erzmetall", Vol. 23 (1970) No. 3, pages 108–113).

It is an object of the invention to provide a Waelz process which results in a higher throughput rate and permits of the use of inexpensive reducing agents.

SUMMARY OF THE INVENTION

This object is accomplished in accordance with the invention in that oxygen-containing gases are blown, e.g., at controlled rates, through tubular air nozzles into the charge disposed over tubular air nozzles in that region of the heating-up zone which begins where ignitable particles of the solid reducing agent begin to occur and which terminates at up to 50 percent of the length of the kiln. The solid reducing agents which have a high content of volatile combustible reducing agents contain more than 20 percent of such constituents and are, e.g., brown coals or lignites. Others useful for this purpose include: subbituminous coals and bituminous coals.

These solid reducing agents can constitute 100 percent of all solid reducing agents or they can be fed in a mixture with solid reducing agents having a low content of volatile combustible constituents, e.g., with coke or anthracite.

Ignitable particles of the reducing agents begin to occur in the lower portion of the rolling surface of the charge. As the individual particles roll down on the surface of the rolling bed, the particles are heated up by the hot kiln gases and reach the ignition temperature for the first time shortly before they enter the rolling bed, at a certain distance from the charging end. At this point, oxygen-containing gases are blown through tubular air nozzles into the charge for the first time. As a result, the ignitable reducing agent particles which have been ignited are not cooled below the ignition temperature as they enter the colder interior of the rolling bed. The combustion which now takes place in the charge results in a release of additional volatile combustible constituents and a chain reaction soon spreads throughout the cross-section of the charge. The entire heat content of the volatile combustible constituents is now utilized to heat the charge and the heat exchange surface which is available for a transfer of heat is considerably increased. Additional tubular air nozzles spaced about 2.5 to 3.5 meters apart along the kiln are provided in the heating-up zone. With such spacing, sufficient oxygen can usually be blown into the bed and the kiln structure is not weakened. At each blowing station the radial tubular air nozzles are arranged in an annular series, in which they are spaced usually 2.5 to 3.5 meters apart also in the peripheral direction. Control mechanisms are provided which ensure that oxygen-containing gases are supplied only to those tubular air nozzles of an annular series which are disposed under the charge. Air is generally used as oxygen-containing gas.

The term "tubular air nozzles" describes gas feeders which extend through the kiln wall and the refractory lining of the rotary kiln and have outlet openings lying in the inside surface of the refractory lining or disposed slightly inside or outside of said surface. The tubular air nozzles may consist of ceramic or metallic materials.

Oxygen-containing gases are supplied into the free kiln space in the heating-up zone and in the reduction zone in the form of air sucked into the discharge end of the rotary kiln. The term "sucked-in air" includes air which is blown into the discharge end. In both cases the air is sucked through the kiln by the suction fan which succeeds the means for cleaning the exhaust gases. The air is supplied at the required rate under the control of the sub-atmospheric pressure produced by the blower. Combustible substances, such as coke oven gas, refinery gas, natural gas or petroleum can be added to the oxygen-containing substances which are blown in through the tubular air nozzles. In this way the ignition can be effected sooner or more quickly. The combustible substances which are added may in part replace the combustible volatile constituents of the solid reducing agent if the same has a relatively low content of said substances.

Oil-containing rolling mill scale can be charged into the kiln and the oil contained in such scale can be used as a combustible volatile constituent to heat up the charge.

In a preferred embodiment of the invention, oxygen-containing gas is blown through the tubular air nozzles into the heating-up zone in a region which begins where the reducing agent has a temperature of about 300° C. and which terminates where the charge has a temperature of 800° to 950° C. The lower temperature of the reducing agents is measured in the lower part of the surface of the rolling bed formed by the charge, shortly before the particles enter the rolling bed, as has been described. The upper temperature is the average temperature of the entire rolling bed formed by the charge because a substantial equalization of temperature has taken place in the rolling bed before that temperature is reached. The selection of that temperature range ensures that the charge will not be cold-blown at temperatures below the lower temperature limit (300° C.) and that the volatile constituents will be substantially expelled at the upper temperature limit (800° to 950° C.).

According to a preferred feature, 10 to 50 percent of the entire quantity of oxygen fed into the rotary kiln is blown through the tubular air nozzles. This will result in a particularly high heating-up rate.

According to a preferred feature, the solid carbonaceous reducing agent consists at least in part of disintegrated waste rubber. Disintegrated automobile tires are particularly desirable. The waste rubber is charged to the rotary kiln at its charging end together with the remaining charge. The zinc contained in the automobile tires in an amount of up to 2 percent is co-volatilized in the Waelz kiln and is collected from the exhaust gases jointly with the zinc which has been volatilized from the charge. The iron contained in the automobile tires becomes available together with reduced iron from the charge in the material discharged from the kiln. It is apparent that the use of waste rubber does not involve an additional expenditure and results only in products which can be utilized and eliminates the problems and costs which would be involved in dumping waste rubber or in a different processing thereof.

According to a preferred feature, the waste rubber which is fed has a particle size below 30 mm. This results in a thorough mixing of the waste rubber and the remaining charge and in an effective utilization of the volatile combustible constituents in the rolling bed in the heating-up zone when the ignition temperature has been reached. Where a mixture of solid reducing agents having a high content of volatile combustible constituents and solid reducing agents having a low content of such constituents is used in the process according to the present invention, the advantages afforded by the process according to German Offenlegungsschrift 26 21 969 will be obtained and, in addition, the heating-up zone will be shortened considerably and the volatile constituents will be utilized in a high degree by being burnt in the rolling bed. It is also possible to use only solid reducing agents having a high content of volatile combustible constituents because they can be utilized in the rolling bed and will not enter the free kiln space without being burnt. Because this will decrease the total energy requirement, a larger carbon surplus will be preserved for the reduction zone even when only such reducing agents are used. That carbon surplus will ensure the same safety in the reduction zone as far as sintering and reoxidation are concerned. In all cases the temperature level in the reducing zone will be lowered.

EXAMPLES

A Waelz kiln which had an inside diameter of 0.8 m and a length of 12 m was charged with a mixture of Linowitz-dust and blast furnace washing tower sludge which was rolled on a pelletizing disc and converted into granules of about 5 to 20 millimeters. On a dry basis the granules contained: 50.2 Fe, 3.5% Zn, 1.8% Pb, 1.9% SiO$_2$, 11.4% CaO, 0.7% S, 4.1% C. The granules had a moisture content of 14.3%. Brown coal was used as reduction material which had the following composition: 44% C$_{fix}$, 50% volatile constituents and 6% ash. The moisture content was 20%.

EXAMPLE 1

The Waelz kiln was charged with 300 kg/h of granules. The charging rate of the brown coal corresponded to a C$_{fix}$/Fe ratio of 0.5. The entire combustion air was sucked in from the kiln discharge end. The metallization of the discharged material was 98% in the average. Zn and Pb were volatilized to more than 90% and could be separated from the waste gas of the kiln in form of a flue dust suitable for feeding into non-ferrous smelters.

EXAMPLE 2

The same Waelz kiln was equipped with nozzle blocks. At a distance of 2 meters from the charging end, where the brown coal had a temperature of 300° C., air was blown in through nozzle blocks, but only through such nozzle blocks which were covered by the charge material. A second ring of nozzle blocks was installed at a distance of 3.5 meters from the charging end in a region where the temperature of the charge material was 800° C. A 30% share of the total air which was supplied into the kiln, was supplied through nozzle blocks. By this feature the length of the heating-up zone was shortened and the charging rate of granules could be increased to 420 kg/h without deterioration of the operating conditions as obtained in example 1.

EXAMPLE 3

With the operating conditions of example 2 the brown coal was replaced step by step to 100% by disintegrated waste tire material with a grain size of 20 to 30 millimeters. The operating conditions remained practically the same. The Zn-content of the waste tire material was practically completely volatilized and could be separated from the kiln waste gas together with the zinc of the granules in form of a flue dust suitable for feeding into non-ferrous smelters. The steel content of the waste tire material went into the discharge material and could also be recovered.

The waste tire material had the following composition without the steel material:
C$_{fixed}$: 32.5%
volatile constituents: 64.6%
ash: 2.9%
The sulfur content was 1.7% and the zinc content 1.3%.

What is claimed is:

1. In a Waelz process of volatilizing zinc and lead from iron containing and oxide containing material in an inclined rotary kiln, which is charged at its upper end with the material together with solid carbonaceous reducing agent having a high content of volatile combustible constituents, wherein the reduction and volatization are effected below the softening point of the charge, metallic iron-containing material is discharged from the lower end of the rotary kiln, combustion air is sucked into the lower end of the rotary kiln and the exhaust gases are sucked from the upper end, the improvement which comprises blowing oxygen-containing gases through tubular air nozzles which extend through the kiln wall and the refractory lining of the rotary kiln and have outlet openings lying in the inside surface of the refractory lining or dispose lightly inside or outside of said surface and into the charge disposed over said tubular air nozzles in that region of the heating up zone which begins where ignitable particles of the solid reducing agent begin to occur and which terminates at up to 50% of the length of said kiln said oxygen containing gas being blown through the tubular air nozzles into the heating-up zone in a region which begins with a reducing agent and has a temperature of about 300° C. and terminates where a charge has a temperature of 800° to 950° C.

2. A process according to claim 1, wherein said solid carbonaceous reducing agent having a high content of volatile combustible constituents comprises sub-bituminous coal or bituminous coal.

3. A Waelz process according to claim 1 wherein 10 to 50 percent of the entire quantity of oxygen fed into the rotary kiln is blown through the said tubular air nozzles.

4. A Waelz process according to claim 1 wherein the solid carbonaceous reducing agent comprises at least in part of disintegrated waste rubber.

5. A Waelz process according to claim 4 wherein the waste rubber which is fed has a particles size below 30 mm.

* * * * *